UNITED STATES PATENT OFFICE.

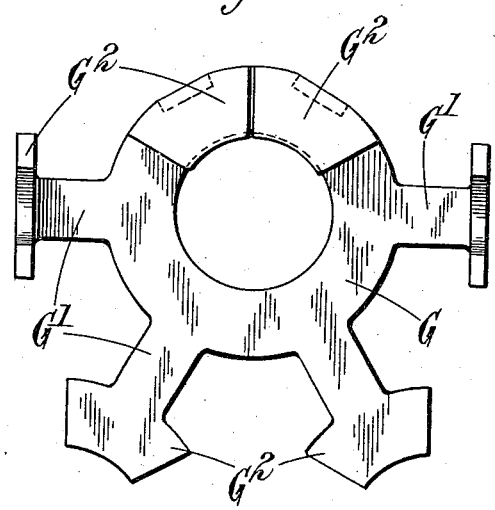
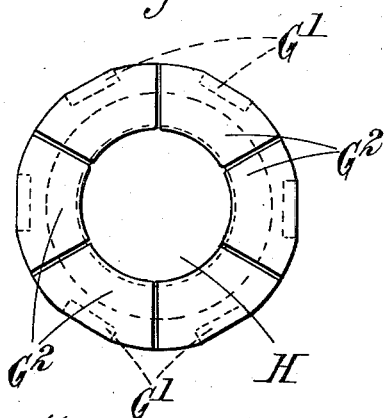
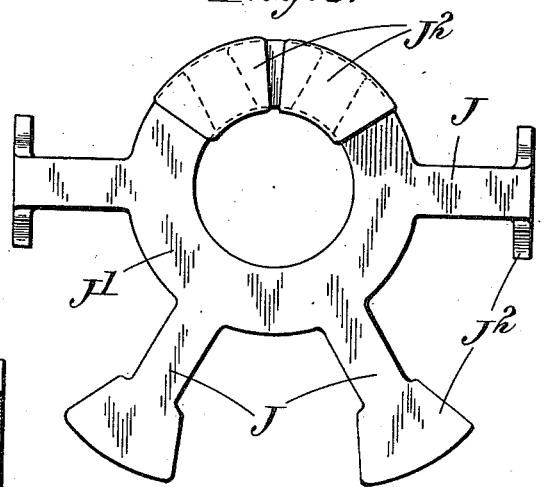
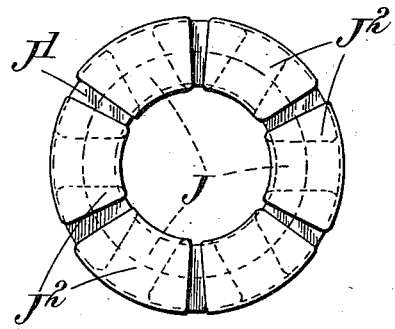
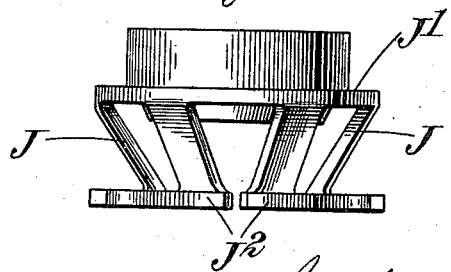

THOMAS SLOPER, OF DEVIZES, ENGLAND.

ANTISLIPPING STUD.

1,009,191. Specification of Letters Patent. Patented Nov. 21, 1911.

Application filed April 25, 1910. Serial No. 557,521.

*To all whom it may concern:*

Be it known that I, THOMAS SLOPER, a subject of the King of England, residing at Devizes, in the county of Wilts, England, have invented certain new and useful Improvements in Antislipping Studs, of which the following is a specification.

This invention is for improvements in or relating to non-slipping surfaces for elastic tires and other elastic goods and has for its object to provide a composite stud or block which may be more durable than those heretofore produced.

It is well known that studs for tires are liable to wear rapidly and if made of steel and hardened, they are liable to break. To overcome these difficulties composite studs have been introduced, that is studs whose head and body portions are made of separate pieces secured together during manufacture. Preferably the head of each stud is of hardened material and the body portion of soft material, so that the part of the finished stud exposed to wear, namely the head, is hard, while that part that carries the head is softer and does not so readily fracture. In some cases, however, it may be preferred to make both the head and body portions of hard or comparatively hard material.

According to this invention the body portion of the composite stud comprises two perforated disks that preferably take the form of annular or washer-like parts that are connected face to face by distance pieces. Preferably the washer-like parts and distance pieces are all integral. The body portions may be stamped or otherwise formed and if stamped it is sometimes preferred to form one at least of the disks or washer-like parts of a number of segments that are arranged around a given center, the segments being in contact with each other or slightly separated as found convenient. It will be seen that this still constitutes a washer-like part although instead of being continuous it is interrupted.

In the accompanying drawings which illustrate one method of carrying out this invention, Figure 1 is a plan of a body portion of the stud illustrating different steps in the manufacture of one form of stud according to this invention, Fig. 2 is an underside view of the stud shown in Fig. 1 completed, Fig. 3 shows the body portion of yet another form of stud according to this invention and illustrates different steps in the process of making it up, Fig. 4 is an underside view of the stud shown in Fig. 3 completed, and Fig. 5 is a side elevation of the same completed stud.

Like letters indicate like parts throughout the accompanying drawings.

Referring to the drawings and particularly to Fig. 5, it will be seen that the completed stud comprises an annular disk from which radiate a plurality of arms that are bent to provide a second, interrupted, or broken disk, and a head portion secured to one of said disks. The two disk-like sections of the stud being connected by separated spacing or distance pieces and being of the form shown, it will be seen that when the device is embedded in rubber the latter is permitted to freely enter the spaces and after vulcanization the stud is securely locked in place. The construction is one that affords considerable strength as the washer-like parts and distance pieces forming the body are all integral and the hardened head is firmly secured to the body part.

The body portion is stamped from a metal sheet in the form of a washer G having radiating from it the distance pieces $G^1$ and segments $G^2$ on the ends of the distance pieces. The segments $G^2$ are so shaped that when the distance pieces $G^1$ are bent upright to the washer G and the segments bent over parallel to the washer as shown in Fig. 2, they constitute the second or lower washer-like portion, this being further interrupted instead of continuous as before. The head H is secured in the washer-like portion G by doming the washer and forcing the metal into a groove in the head. In Fig. 1 two of the segments $G^2$ are shown bent over into place while two others are bent at right angles to the distance pieces $G^1$ but the latter are not bent up into position relatively to the part G and two other distance pieces with their segments are shown in the flat.

It will be seen that in the construction of stud shown in Figs. 1 and 2 the distance pieces are connected to the outer circumference of the two disks or washer-like parts in Figs. 3 to 5 a form of stud is shown made up in the same manner as that illustrated in Figs. 1 and 2, but the distance pieces J are connected to the outer edge of the disk or washer-like part $J^1$ and to the inner edge of the disk or washer-like part formed by the segments J². To effect this the distance pieces J instead of being upright to the washer J¹ are bent inwardly toward the center of the washer and the segments J² are turned outwardly as is clearly shown in the drawings. It will be understood that the various methods of stamping up or drawing the body portions of the studs are only given by way of example as many different methods may obviously be adopted.

In all the constructions described the body of each stud is preferably made of soft steel and by its construction obtains a good anchorage in the rubber in which it is embedded while the head being preferably of hardened steel is durable. Nevertheless the body part can be made of hard metal, but the above described construction is preferred.

What I claim as my invention and desire to secure by Letters Patent is:—

1. The herein described anti-slipping stud, comprising an annular disk, a plurality of arms radiating from said disk and bent to provide a second, interrupted disk and spacing or distance pieces between said disks, and a head portion secured to one of said disks.

2. The herein described anti-slipping stud, comprising a perforated sheet metal disk having a plurality of integral radiating arms bent to provide a second disk out of contact with said first disk, and a separate head portion secured to one of said disks.

3. The herein described anti-slipping stud, comprising a perforated sheet metal disk having a plurality of radiating arms terminating in segments of greater width than said arms, the latter being bent to bring said segments relatively close together to form a second, interrupted disk at one side of that aforesaid, and a head portion secured to one of said disks.

In testimony whereof I have signed my name to this specification in the presence of two subscribing witnesses.

THOMAS SLOPER.

Witnesses:
H. D. JAMESON,
CARL R. LOOP.

Copies of this patent may be obtained for five cents each, by addressing the "Commissioner of Patents, Washington, D. C."